US012378841B2

(12) United States Patent
Patton et al.

(10) Patent No.: US 12,378,841 B2
(45) Date of Patent: Aug. 5, 2025

(54) METHODOLOGY AND SYSTEM FOR UTILIZING RIG POWER AND MUD PUMP ASSEMBLY

(71) Applicant: Schlumberger Technology Corporation, Sugar Land, TX (US)

(72) Inventors: Bartley Patton, Rosharon, TX (US); William Troy Huey, Denver, CO (US); Mark Vaughan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/351,223

(22) Filed: Jul. 12, 2023

(65) Prior Publication Data

US 2024/0309715 A1 Sep. 19, 2024

Related U.S. Application Data

(60) Provisional application No. 63/490,956, filed on Mar. 17, 2023.

(51) Int. Cl.

| | |
|---|---|
| ***E21B 33/13*** | (2006.01) |
| ***B28C 9/00*** | (2006.01) |
| ***E21B 7/00*** | (2006.01) |
| ***E21B 21/06*** | (2006.01) |
| ***E21B 21/08*** | (2006.01) |

(52) U.S. Cl.

CPC .............. *E21B 33/13* (2013.01); *B28C 9/004* (2013.01); *E21B 7/00* (2013.01); *E21B 21/062* (2013.01); *E21B 21/08* (2013.01)

(58) Field of Classification Search

CPC ........... E21B 21/062; E21B 7/00; E21B 33/13

See application file for complete search history.

(56) References Cited

U.S. PATENT DOCUMENTS 1,137,134 A 4/1915 Harley
2,194,054 A 3/1940 Arvid
(Continued)

FOREIGN PATENT DOCUMENTS

CN 106050215 A 10/2016
CN 215719294 U 2/2022
(Continued)

OTHER PUBLICATIONS

Office Action issued in U.S. Appl. No. 18/351,204 dated Mar. 12, 2024, 14 pages.

(Continued)

*Primary Examiner* — Catherine Loikith
(74) *Attorney, Agent, or Firm* — Jeffrey D. Frantz

(57) ABSTRACT

A technique facilitates a drilling operation, e.g. a land-based drilling operation, by enabling a substantial reduction in the number of equipment components. According to an embodiment, a mud pump assembly is provided with at least one mud pump located on a rig positioned at a wellsite. Electric power is provided to the rig to enable operation of the rig, including operation of the mud pumps when pumping mud downhole to facilitate drilling of a borehole. The rig's electric power also is used to operate a cement mixer for mixing a cementing fluid. This cementing fluid may be pumped downhole during a cementing operation by the same mud pumps employed during the mud pumping operation.

15 Claims, 5 Drawing Sheets

(56) References Cited

U.S. PATENT DOCUMENTS

| | | | |
|---|---|---|---|
| 2,216,573 | A | 10/1940 | Owsley |
| 2,282,597 | A | 5/1942 | Archer |
| 3,201,093 | A | 8/1965 | Smith |
| 3,227,213 | A | 1/1966 | Smith |
| 3,435,906 | A | 4/1969 | Nicolson |
| 3,741,533 | A | 6/1973 | Winn |
| 3,891,037 | A | 6/1975 | Well |
| 3,976,148 | A | 8/1976 | Maus |
| 4,178,142 | A | 12/1979 | Schwing |
| 4,191,513 | A | 3/1980 | Schwing |
| 4,341,508 | A | 7/1982 | Rambin, Jr. |
| 4,611,973 | A | 9/1986 | Birdwell |
| 4,634,352 | A | 1/1987 | Austin |
| 4,703,813 | A | 11/1987 | Sieler |
| 4,880,365 | A | 11/1989 | Austin |
| 4,899,832 | A | 2/1990 | Bierscheid, Jr. |
| 5,046,855 | A | 9/1991 | Allen |
| 5,114,239 | A | 5/1992 | Allen |
| 5,289,877 | A | 3/1994 | Naegele |
| 5,344,570 | A | 9/1994 | McLachlan |
| 5,571,281 | A | 11/1996 | Allen |
| 5,580,166 | A | 12/1996 | Schmittchen |
| 5,775,803 | A | 7/1998 | Montgomery |
| 6,048,132 | A | 4/2000 | Kupke |
| 6,048,135 | A | 4/2000 | Williford |
| 6,056,071 | A | 5/2000 | Scott |
| 6,228,153 | B1 | 5/2001 | Saitoh |
| 6,505,691 | B2 | 1/2003 | Judge |
| 6,527,062 | B2 | 3/2003 | Elkins |
| 6,749,330 | B2 | 6/2004 | Allen |
| 6,904,982 | B2 | 6/2005 | Judge |
| 6,925,392 | B2 | 8/2005 | McNeil, III |
| 7,004,730 | B1 | 2/2006 | Williams |
| 7,044,239 | B2 | 5/2006 | Pinckard |
| 7,096,948 | B2 | 8/2006 | Mosing |
| 7,252,147 | B2 | 8/2007 | Badalamenti |
| 7,730,967 | B2 | 6/2010 | Ballantyne |
| 7,823,656 | B1 | 11/2010 | Williams |
| 7,921,937 | B2 | 4/2011 | Brackin |
| 7,980,326 | B2 | 7/2011 | Tibbitts |
| 8,201,628 | B2 | 6/2012 | Lovorn |
| 8,261,826 | B2 | 9/2012 | Lovorn |
| 8,281,875 | B2 | 10/2012 | Lovorn |
| 8,347,957 | B2 | 1/2013 | Stephenson |
| 8,397,836 | B2 | 3/2013 | Pool |
| 8,404,297 | B2 | 3/2013 | Arango Moreno |
| 8,812,236 | B1 | 8/2014 | Freeman |
| 8,833,488 | B2 | 9/2014 | Knudsen |
| 8,899,348 | B2 | 12/2014 | Henderson |
| 8,905,157 | B2 | 12/2014 | Jiao |
| 9,080,407 | B2 | 7/2015 | Bernard |
| 9,169,700 | B2 | 10/2015 | Curtis |
| 9,249,638 | B2 | 2/2016 | Bernard |
| 9,670,749 | B2 | 6/2017 | Pessin |
| 11,174,689 | B2 | 11/2021 | Aguirre |
| 11,371,314 | B2 * | 6/2022 | Orban ..................... E21B 33/13 |
| 2005/0121278 | A1 | 6/2005 | Arhab |
| 2006/0196695 | A1 | 9/2006 | Giroux |
| 2006/0239834 | A1 | 10/2006 | Larson |
| 2007/0295509 | A1 | 12/2007 | Pessin |
| 2008/0260545 | A1 | 10/2008 | Frokjaer |
| 2009/0183874 | A1 | 7/2009 | Fordyce |
| 2010/0027371 | A1 | 2/2010 | Lucas |
| 2010/0310384 | A1 | 12/2010 | Stephenson |
| 2013/0118752 | A1 | 5/2013 | Hannegan |
| 2013/0248182 | A1 | 9/2013 | Chong |
| 2014/0299377 | A1 | 10/2014 | Abbassian |
| 2014/0309936 | A1 | 10/2014 | Abbassian |
| 2016/0288368 | A1 | 10/2016 | Orban |
| 2016/0289012 | A1 | 10/2016 | Orban |
| 2016/0334300 | A1 | 11/2016 | Hilpert |
| 2017/0016433 | A1 | 1/2017 | Chong |
| 2017/0101827 | A1 | 4/2017 | Orban |
| 2017/0198554 | A1 | 7/2017 | Dykstra |
| 2017/0226813 | A1 | 8/2017 | Northam |
| 2017/0259457 | A1 | 9/2017 | Chong |
| 2017/0268323 | A1 | 9/2017 | Dykstra |
| 2018/0258719 | A1 | 9/2018 | Orban |
| 2019/0093433 | A1 | 3/2019 | Aguirre |
| 2019/0264517 | A1 | 8/2019 | Chong |
| 2020/0080391 | A1 | 3/2020 | Marlatt |
| 2022/0325601 | A1 | 10/2022 | Orban |

FOREIGN PATENT DOCUMENTS

| | | | |
|---|---|---|---|
| WO | 9925608 | A1 | 5/1999 |
| WO | 03001062 | A1 | 1/2003 |
| WO | 2005088131 | A1 | 9/2005 |
| WO | 2016167747 | A1 | 10/2016 |
| WO | 2019165393 | A1 | 8/2019 |
| WO | 2019173842 | A1 | 9/2019 |

OTHER PUBLICATIONS

Office Action issued in U.S. Appl. No. 18/351,223 dated Jun. 6, 2024, 10 pages.

International Search Report and Written Opinion issued in International Patent application PCT/US2024/020159 on Jul. 3, 2024, 12 pages.

International Search Report and Written Opinion issued in International Patent application PCT/US2024/020152 on Jul. 2, 2024, 11 pages.

* cited by examiner

METHODOLOGY AND SYSTEM FOR UTILIZING RIG POWER AND MUD PUMP ASSEMBLY

CROSS-REFERENCE TO RELATED APPLICATION

The present document is based on and claims priority to U.S. Provisional Application Ser. No. 63/490,956, filed Mar. 17, 2023, which is incorporated herein by reference in its entirety.

BACKGROUND

Hydrocarbon fluids such as oil and natural gas are obtained from a well located in a subterranean geologic formation, referred to as a reservoir. The well is prepared by drilling and completing a wellbore that penetrates the hydrocarbon-bearing formation. The drilling and completing processes are complex and expensive involving a wide variety of equipment which must be transported to the wellsite and then operated and maintained. This equipment often includes a mud pumping assembly and a cement pumping assembly to facilitate drilling of the wellbore and cementing of a wellbore casing.

In a land-based operation, at least some of this equipment may be positioned on a land rig. However, the cement mixing equipment is located on a separate cement skid which is not part of the rig. Power for the cement mixing equipment is provided by separate generators which, in turn, are powered by dedicated diesel engines. Once the cementing fluid, e.g. cement slurry, is mixed on the separate cement skid, the cementing fluid is routed to cementing fluid pumps which are powered by dedicated motive units. Accordingly, the overall cementing system comprises a large number of independent, dedicated components. Substantial expense is involved in transporting all of these components to the wellsite, maintaining these components, and operating these components. Additionally, the equipment requires substantial space at the wellsite.

SUMMARY

In general, a methodology and system are provided for facilitating a drilling operation, e.g. a land-based drilling operation, with a substantial reduction in the number of equipment components. According to an embodiment, a mud pump assembly is provided with at least one mud pump located on a rig positioned at a wellsite. Electric power is provided to the rig to enable operation of the rig, including operation of the mud pumps when pumping mud downhole to facilitate drilling of a borehole. The rig's electric power also is used to operate a cement mixer for mixing a cementing fluid. This cementing fluid may be pumped downhole during a cementing operation by the same mud pumps employed during the mud pumping operation.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
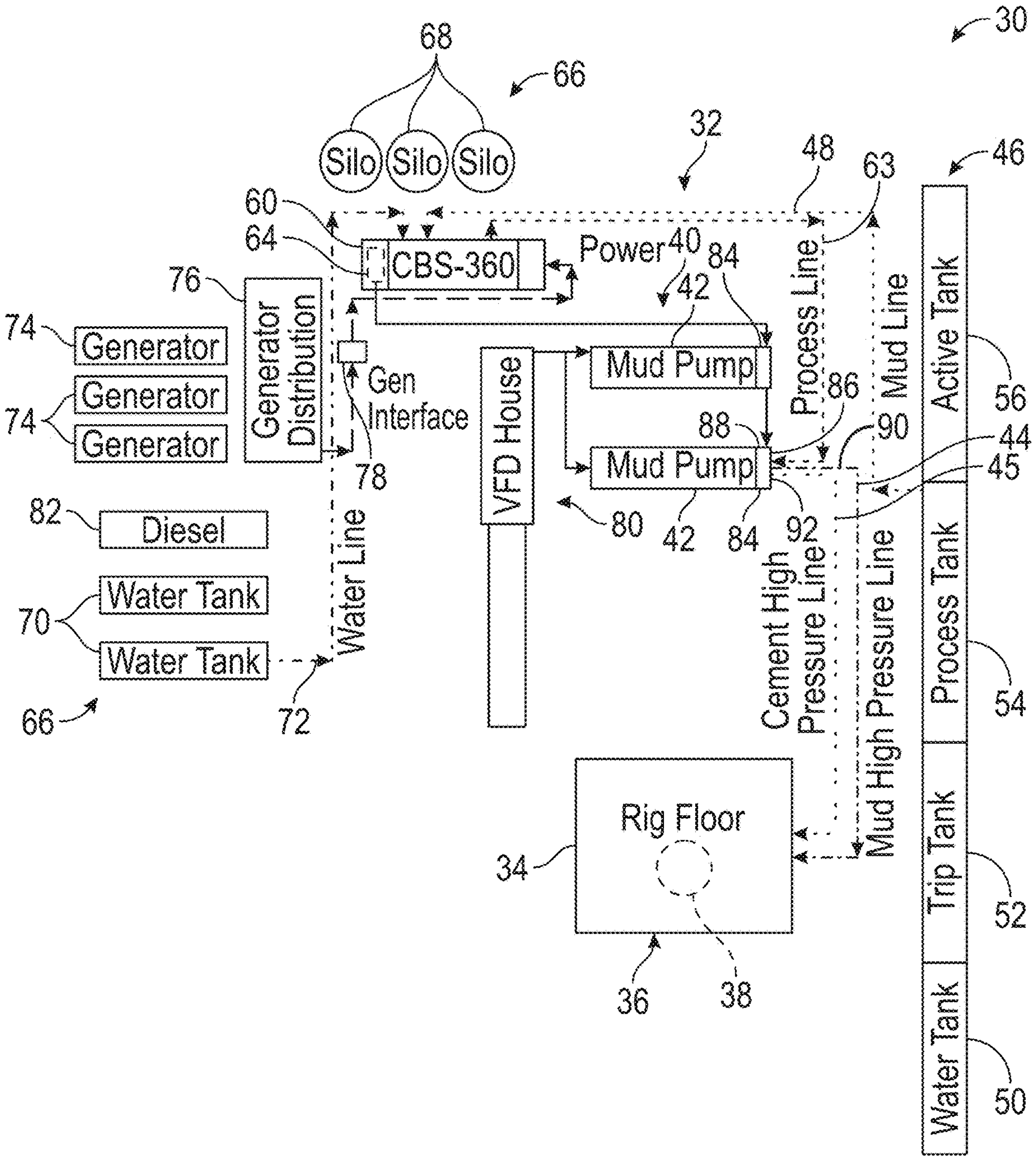
FIG. 1 is an illustration of an example of a wellsite layout in which a mud pump assembly and a cement mixing system are deployed on or coupled with a rig in a manner able to utilize common power for both mud pumping operations and cementing operations, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible. This description is not to be taken in a limiting sense, but rather for the purpose of describing general principles of the implementations. The scope of the described implementations should be ascertained with reference to the issued claims.

The disclosure herein generally involves facilitating a drilling operation, e.g. a land-based drilling operation, with a substantial reduction in the number of equipment components. According to an embodiment, a mud pump assembly is provided with at least one mud pump located on a rig positioned at a wellsite. Electric power is provided to the rig to enable operation of the rig, including operation of the mud pumps when pumping mud downhole to facilitate drilling of a borehole. The rig's electric power also is used to operate a cement mixer for mixing a cementing fluid. This cementing fluid may be pumped downhole during a cementing operation by the same mud pumps employed during the mud pumping operation.

By way of example, the land-based cement mixing utilizes a cement mixing system, e.g. a cement mixing skid, having a direct interface with the rig such that the rig mud pumps are used to pump both cementing fluid and mud as well as potential other fluids such as displacement fluid. The cement mixing system also has an electrical interface with the rig for electric power. In some embodiments, the cement mixing system is constructed as a cement mixing skid able to move with the rig via a suitable coupling such as a tail board skid design. However, other skids may be constructed to enable use of a forklift for moving the skid onto a trailer when moved from rig to rig.

Use of the rig's power may be achieved via a suitable coupling such as a generator interface box which allows the cement mixing system to plug into the rig's power without disruption of the rig generators. The generator interface box provides a low-cost module which may be permanently connected to the generator to provide a safe method of connecting and disconnecting the cement mixing system from the rig electric power. In the event the rig operates at a different voltage then the cement mixing system, a suitable transformer may be used to change the voltage, e.g. a step down transformer may be used to drop the voltage from a higher voltage to the required voltage for the cement mixing system.

In some embodiments, the cement mixing system may be equipped with a direct injection liquid additive pump which injects a desired additive, e.g. retardant, into water used for mixing the cementing fluid. This approach enables better standardization of the cement blend and eliminates spiking while mixing so as to improve cement quality. Depending on the application, the cement mixing unit may be equipped with a mix and averaging tub while omitting conventional displacement tanks.

The cementing operations and mud pumping operations may be monitored by a variety of sensor systems. For example, a downhole flowmeter may be installed to accurately measure displacement and to enable comparison with data from monitoring mud pump strokes and mud pit levels. Other features also may be used facilitate the process including use of process flow lines, e.g. piping, routed in a generally straight line from the pressurizing pump suction through a flowmeter, and straight to the rig mud pumps. The straight flows tend to minimize potential contamination of the cement process piping with, for example, drilling mud.

Effectively, the rig and overall wellsite layout enables use of a cementing system which is easily integrated with an electric land rig. If the cementing system is mounted on a cement mixer skid, the skid may be constructed to stay with the rig and to move along with the rig equipment. This combination is enabled at least in part by utilizing the mud pumps of the rig to perform the high-pressure cement pumping operations. By integrating the cementing system with the rig's power, the otherwise dedicated cement pump and corresponding motive unit can be eliminated.

According to some embodiments, the cement mixing system may be included on, e.g. mounted on, the rig. With this approach, the cement mixing system may be constructed such that the cementing system treating lines are fully integrated into the rig along with the power supply. One approach for mounting the cementing system on the rig is to utilize the hopper house which is often positioned on the rig. A hopper house is used by the rig when, for example, cutting bags of bentonite or other powdered products used to alter the properties of the drilling mud. The cement mixing system may be used to replace some of the normal hopper house components. For example, the cement mixing system may be used to provide the mixing and eductor capabilities otherwise separately associated with the mud pumping operation.

As described in greater detail below, the rig and the overall wellsite layout may be simplified by utilizing the mud pumping assembly for both the mud pumping operations during drilling and for the cementing operations. For example, the mud pumps may be run to perform a mud pumping operation by pumping mud downhole during drilling of a borehole, e.g. a wellbore. During stoppage of the mud pumping operation, the same mud pumps may be utilized to perform a cementing operation in which cementing fluid is pumped downhole for cementing of casing. Use of the same mud pumps for both operations enables a wellsite layout which is substantially simplified by removing equipment that would otherwise be required. This approach also substantially reduces costs while also reducing space requirements of the overall wellsite layout.

During a mud pumping operation, fluid in the form of mud is circulated through the borehole, e.g. wellbore, to facilitate drilling of the borehole. The circulating mud provides lubrication and cooling to help advance the drill bit during continued drilling of the borehole. The circulating mud also flushes cuttings from the drill bit back to the surface where they can be separated from the mud, thus allowing reuse of the mud.

As the borehole is drilled, the borehole may be cased by moving sections of casing downhole. A cementing operation is then performed to pump cementing fluid downhole and then up along an exterior of the casing to stabilize the casing within the borehole. To achieve a proper cementing operation, it often is important to make sure mud does not mix with the cementing fluid. Similarly, cementing fluid should not be introduced into the mud during the mud pumping operation. Consequently, the mud pumping assembly is constructed so as to facilitate cleanout of the mud and cementing fluid during transition between the operations.

By way of example, a mud pump suction portion of the mud pump assembly may be modified with a separate cement line which can be isolated from a mud line. Additionally, the mud pump suction portion may incorporate a cleanout port (or ports) which allows the suction portion to be washed/flushed. A separate discharge port may be combined with the mud pump assembly for connection of the cement line. This may be done in a manner which protects the rig floor components from contamination by cement. The separate cement line may be formed of standard treating iron, high-pressure treating hose, or other suitable tubulars.

Referring generally to FIG. 1, an example of a wellsite layout 30 is illustrated in which aspects of the mud pumping system and cementing system have been incorporated into a rig 32. In this example, the wellsite layout 30 comprises the rig 32 having a variety of components including a rig floor 34 which may be positioned generally above a well 36 having at least one borehole 38, e.g. a wellbore. A mud pump assembly 40 is positioned on the rig 32 and comprises at least one mud pump 42, e.g. a plurality of mud pumps 42. The mud pumps 42 are operated to pump mud to the rig floor 34 via a mud line 44 and then down into the borehole 38 to facilitate a drilling operation. (As explained in greater detail below, the mud pumps 42 also may be operated to pump cementing fluid to the rig floor 34 via a separate cementing line 45 and then down into borehole 38 to facilitate a cementing operation.) It should be noted the drilling equipment for drilling borehole 38 has not been illustrated so as to facilitate explanation of the mud pumping operation and cementing operation.

By way of example, mud may be supplied to the mud pumps 42 from a mud supply 46 via mud supply lines 48. The mud supply 46 may comprise a mud pit and various supporting components, such as a water tank 50, a trip tank 52, a process tank 54, and an active tank 56. In operational examples, the mud may be mixed via a suitable mud mixer at various suitable locations and supplied to mud pumps 42. It should be noted a cement mixing skid 60 also is in communication with mud pumps 42 via a process line or lines 63. When skid 60 is integrated with a rig cement mixer, they may be dual purposed and used as mud mixing hopper.

For example, the illustrated embodiment comprises a cement mixing system 64 which is located on the skid 60. In some embodiments, the skid 60 along with cement mixing system 64 may be integrated into the rig 32. This type of integrated system could be used to mix mud additives in lieu of mud mixing hopper. The cement mixing system 64 may be operated to mix a cementing fluid formed from suitable constituents. The constituents may be supplied via supply tanks 66 which may include, for example, silos 68 containing cement, other dry materials, additives, and/or other cementing fluid constituents. The supply tanks 66 also may comprise water tanks 70 which contain water for mixing with the cement and other cementing fluid constituents. The water may be supplied to cement mixing system 64 via a suitable water line 72. (It should be noted that in an alternate embodiment in which the skid 60 is integrated into the rig mud system, the cement mixer 64 also could be used as a mud mixer.)

Additionally, the overall wellsite layout 30 may comprise one or more generators 74 used to provide rig electric power via a generator distribution system 76. However, the rig power may be provided via grid power or other types of auxiliary mobile power. In the example illustrated, the electric power is supplied to a generator interface 78 which, in turn, distributes power to electrically powered components, such as the mud pumps 42, mud mixer, and cement mixing system 64.

By tying the cement mixing system 64 into rig electric power, the overall power requirements and the components for producing that power have been greatly simplified. In a conventional system, the overall cement mixing system comprises a cement pump, a prime mover, displacement tanks, process pumps, a mixer, a mix tub, and a high-pressure pump. Many of these components have been eliminated by using the rig mud pumps 42 for high-pressure pumping of the cementing fluid, e.g. cement slurry, and for displacement of that cementing fluid. For example, the high-pressure pump and the displacement tanks may be eliminated and the cement mixing system 64 may be mounted on a dedicated skid 60 or directly on the rig 32. The use of rig power also enables a reduction in overall power requirements. In a nonlimiting example, the high-pressure pumping of cementing fluid which would otherwise require a relatively high power requirement, e.g. 780 KW, may be reduced to a substantially lower power requirement, e.g. 300 KW, associated with mud pump assembly 40, thus making the process of tying into various sources of electric power much easier.

In some embodiments, the mud pumps 42 may be operated/controlled via a variable frequency drive (VFD) 80 which is coupled with the generators 74. The generator interface 78, VFD 80, and/or other control components may be used to provide a common control system for both mud pumping and cementing operations. Depending on the location of the wellsite layout 30 and/or available electric power, the generators 74 may be diesel powered generators which include diesel engines supplied with diesel from a suitable diesel tank 82. However, other sources of power may be used to directly provide electric power to the rig 32.

To facilitate use of the same mud pumps 42 for both a mud pumping operation and the cementing operation, the pumping of mud and the pumping of cementing fluid are separated. Additionally, the mud pump assembly 40 is constructed to facilitate cleanout of mud and cement so as to avoid contamination of the cement with mud or vice versa as the mud pumps 42 are switched between the mud pumping operation and the cementing operation. According to one embodiment, this dual use of the same mud pumps 42 is facilitated by providing the mud pump assembly 40 with a suction manifold 84 having a separate mud supply 86 and cement supply 88 (see FIG. 1). Furthermore, the mud and the cementing fluid may be discharged to the rig floor 34 and then to the borehole 38 via a mud outlet 90 connected to mud line 44 and a separate cementing fluid outlet 92 connected to the cementing fluid line 45.

Figure 2:
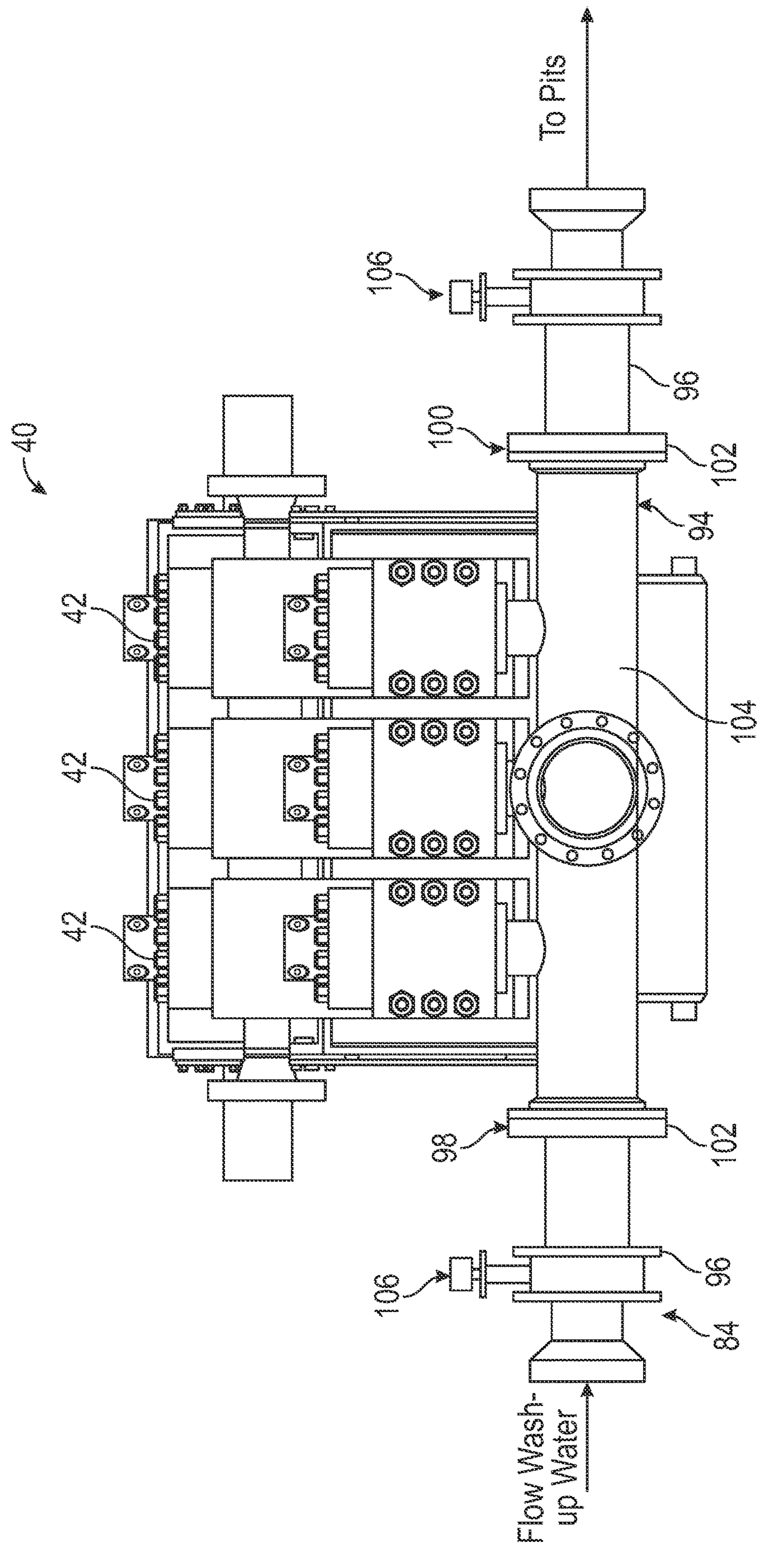
FIG. 2 is an illustration of an example of a mud pump assembly suction manifold which has been constructed to facilitate cleanout of the mud pump assembly between mud pumping and cementing operations when the mud pumping assembly is used for both mud and cementing fluid, according to an embodiment of the disclosure.

With additional reference to FIG. 2, an embodiment of mud pump assembly 40 has been constructed to facilitate cleanout between operations utilizing mud and cementing fluid. According to this example, the suction manifold 84 of mud pump assembly 40 is provided with a flush out line 94 which facilitates flushing of mud and cementing fluid. The flush out line 94 comprises coupling members 96 positioned on an upstream end 98 and a downstream end 100, respectively, to effectively provide cleanout ports. Each coupling member 96 may comprise a suitable coupling 102, e.g. a victaulic coupling, which is connected to flush tubing 104. The flush tubing 104 is able to supply flushing water (or other suitable fluid) to the areas exposed to mud and cementing fluid within mud pump assembly 40. Additionally, each coupling member 96 may comprise an actuatable valve 106, e.g. a butterfly valve, to enable closure of flush out line 94 during, for example, a mud pumping operation or cementing operation.

To flush out mud and/or cementing fluid, a water tubing may be connected to the coupling member 96 at upstream end 98 to enable water to be directed into flush out line 94 and the portions of mud pump assembly 40 exposed to mud and cementing fluid. Similarly, a discharge tubing may be connected to the coupling member 96 at downstream end 100 to direct the "dirty" water to an appropriate discharge area, e.g. to the mud pits.

Figure 3:
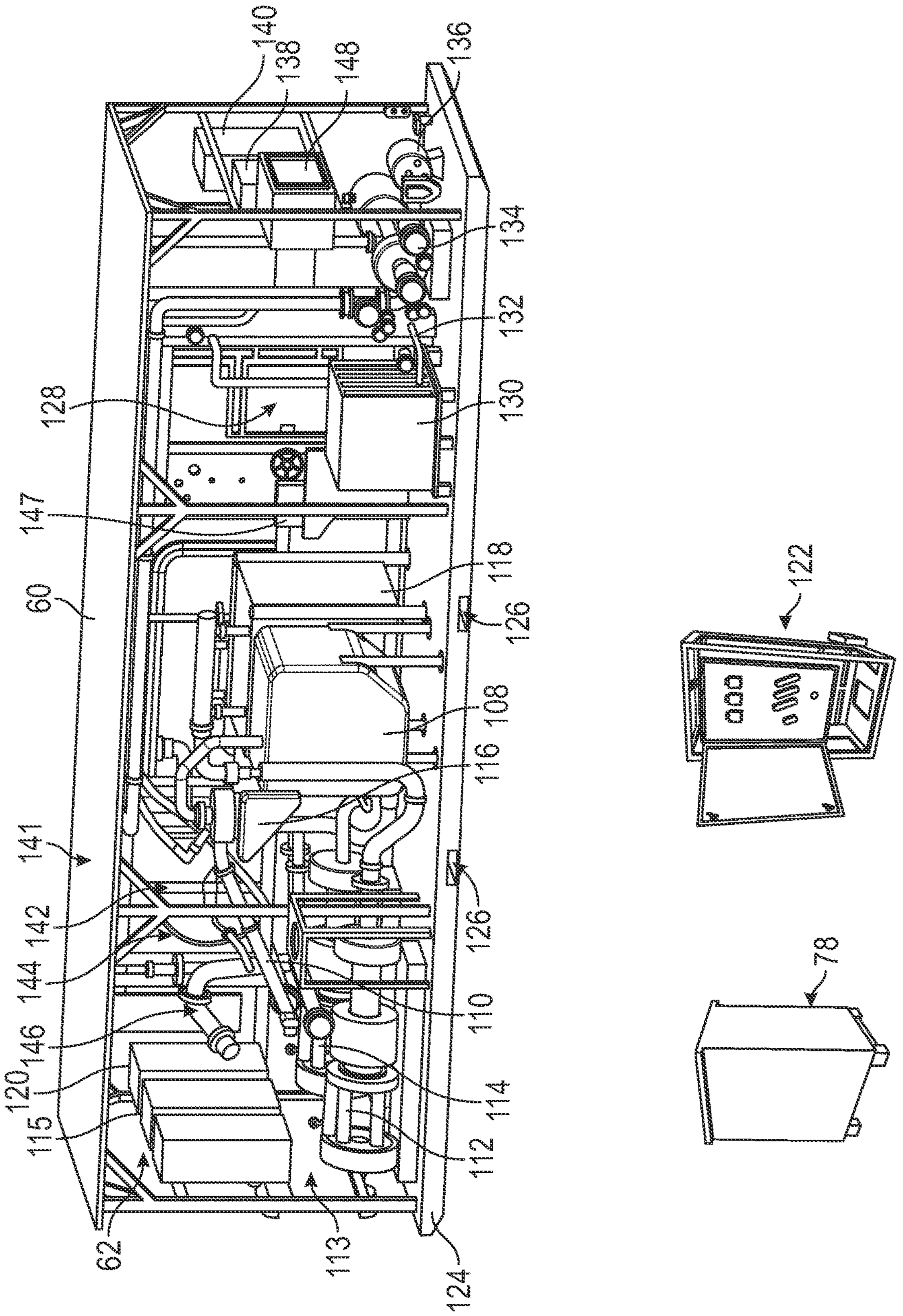
FIG. 3 is an illustration of an example of a cement mixer skid which may be connected into cooperation with the rig.

Referring generally to FIG. 3, one example of cement mixing system 62 is illustrated as mounted on cement mixing skid 60. In this embodiment, cement mixing system 62 comprises a variety of components but those components as well as the arrangement of components may be changed according to the parameters, environment, equipment, and/or other factors of a given borehole drilling operation. By way of example, the cement mixing system 62 may comprise a mix tank 108 coupled with a mixer 110. The mixing system 62 also may comprise a mix pump 112 cooperating with a soft start mix pump 113, a pressurizing pump 114 cooperating with a soft start pressurizing pump 115, a slurry air separator 116, and an averaging tank 118. These components cooperate to enable mixing of the cementing fluid and subsequent pumping of the cementing fluid to the borehole 38 for the cementing operation.

With the illustrated arrangement, the power supply of the rig 32 may be utilized for providing electric power to these various components. Consequently, the cement mixing system 62 may utilize a main power cabinet 120 coupled with the rig power supply via a suitable plug or other connection. In some embodiments, rig power may be supplied through the generator interface 78. If the voltage requirements of the cement mixing system 62 are different than that of the rest of the rig 32, the voltage may be adjusted by a suitable transformer 122, such as a step down transformer.

To facilitate coupling with rig 32, the cement mixing skid 60 may comprise various coupling and transport features. By way of example, the skid 60 may comprise tail board hitch points 124 which allow the skid 60 to be coupled to the rig 32, e.g. to components of the rig 32. Additionally, the skid 60 may comprise forklift pockets 126 which facilitate setup and movement of the cement mixing skid 60.

In some embodiments, the cement mixing system 62 may incorporate a liquid additive system (LAS) 128 which may comprise various components for mixing additives into the cementing fluid. For example, the LAS 128 may be used to inject retarder into the mix water of the cement during mixing of the cementing fluid so as to standardize cement blends with only the amount of retarder being variable within the blend. This can sometimes be beneficial by allowing a bulk blend to be loaded out earlier before the retarder is blended into the bulk blend. For example, the bulk blend may be loaded out prior to lab confirmation of thickening times. Examples of LAS 128 components include a liquid additive tank 130, a liquid additive pump 132, a water make-up pump 134, a pneumatic tank 136, a liquid additive VFD 138, and a soft start water make-up pump 140.

In some embodiments, LAS 128 enables the elimination of a variety of components such as conventional cementing system displacement tanks. In this embodiment, existing rig tanks may be employed as displacement tanks for displacing cement downhole. Consequently, the cementing operation, including the displacement of cement, can be consolidated on the rig 32.

The cement mixing system 62 also may comprise various sensor systems 141 for monitoring operational aspects of the mixing and pumping of cementing fluid. By way of example, the sensor systems 141 may comprise flowmeters, such as a downhole flowmeter 142 and a mixing flowmeter 144. It should be noted that additional and/or alternate components may be used. In this particular example, the mixing system 62 further comprises a bulk cement gooseneck 146, a control console 147, and a tool box 148 which provides operators easy access to tools that might be needed to construct, move, and maintain the cement mixing system 62.

Figure 4:
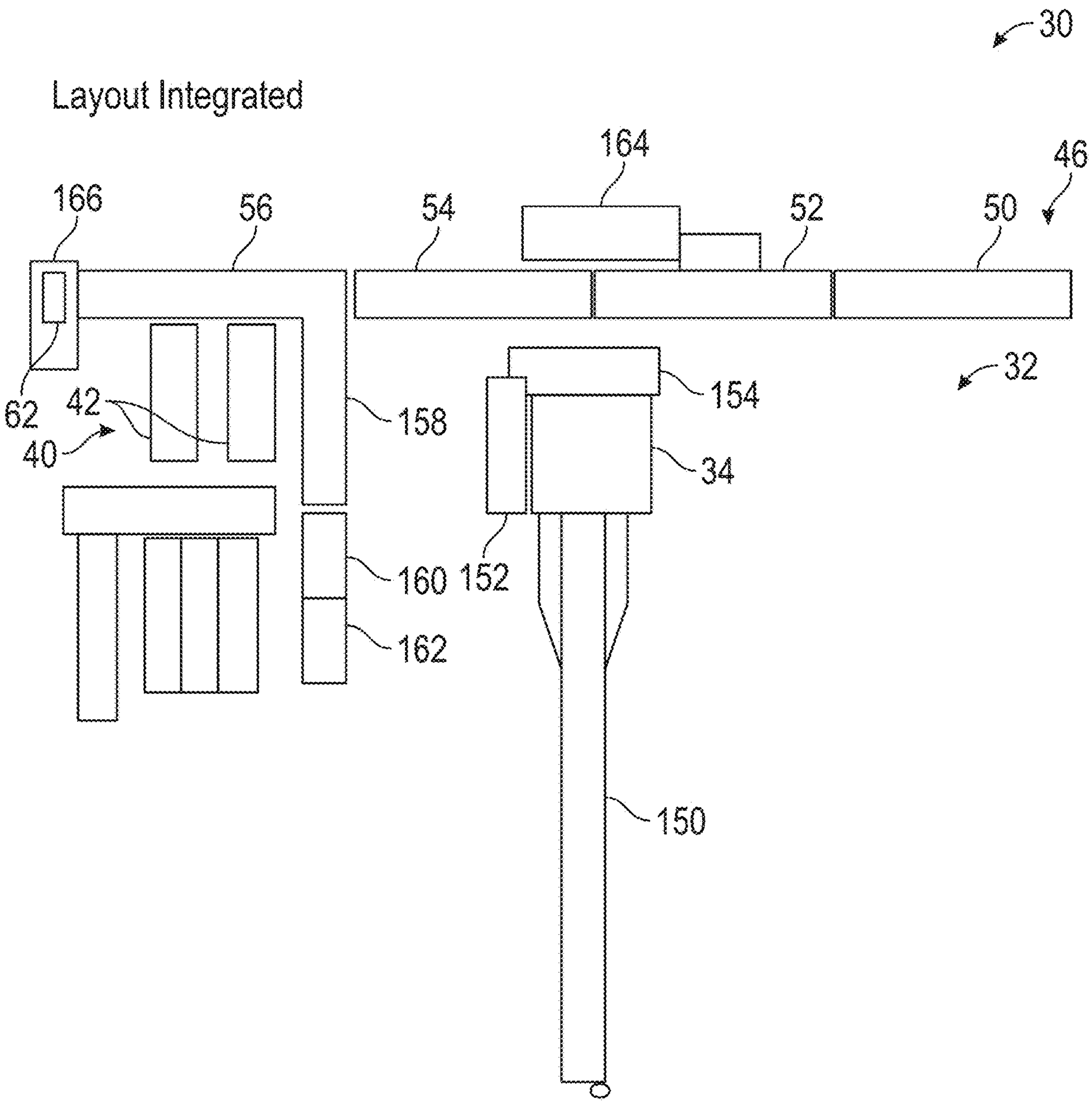
FIG. 4 is another illustration of an example of a wellsite layout in which the mud pump assembly is deployed on a rig along with the cement mixing system, according to an embodiment of the disclosure.

Referring generally to FIG. 4, another embodiment of overall wellsite layout 30 is illustrated. In this embodiment, the cement mixing and cementing operations have been integrated into the rig 32. The components described with reference to FIG. 4 as well as the specific layout of those components are provided as an example of rig integration so as to simplify the borehole drilling operation. However other configurations and other components may be utilized for a given drilling operation.

Similar to the embodiment of FIG. 1, the embodiment illustrated in FIG. 4 comprises mud pump assembly 40 having a plurality of mud pumps 42 mounted on rig 32. The mud pumps 42 are supplied with drilling mud from mud supply 46. The mud supply 46 may comprise a mud pit and various supporting components, such as water tank 50, trip tank 52, process tank 54, and active tank 56. Additionally, various drilling components are positioned on rig 32 and may comprise a derrick 150 positioned above rig floor 34 along with a drillers console 152 and a draw works 154. It should be noted the wellsite layout 30 presented in FIG. 1 did not show the drilling equipment but that layout also can include equipment such as the derrick 150, drillers console 152, and draw works 154.

In the embodiment of FIG. 4, the rig 32 comprises a plurality of the generators 74 working in cooperation with VFD(s) 80 which may be positioned in a VFD house 156. If the generators 74 are diesel powered, diesel fuel may be located in a suitable diesel storage, e.g. diesel tank 82. Other components located on rig 32 may include a festoon house 158, storage 160, a tool basket 162, and a shacker 164. Additionally, the cement mixing system 62 may be located on the rig 32.

Figure 5:
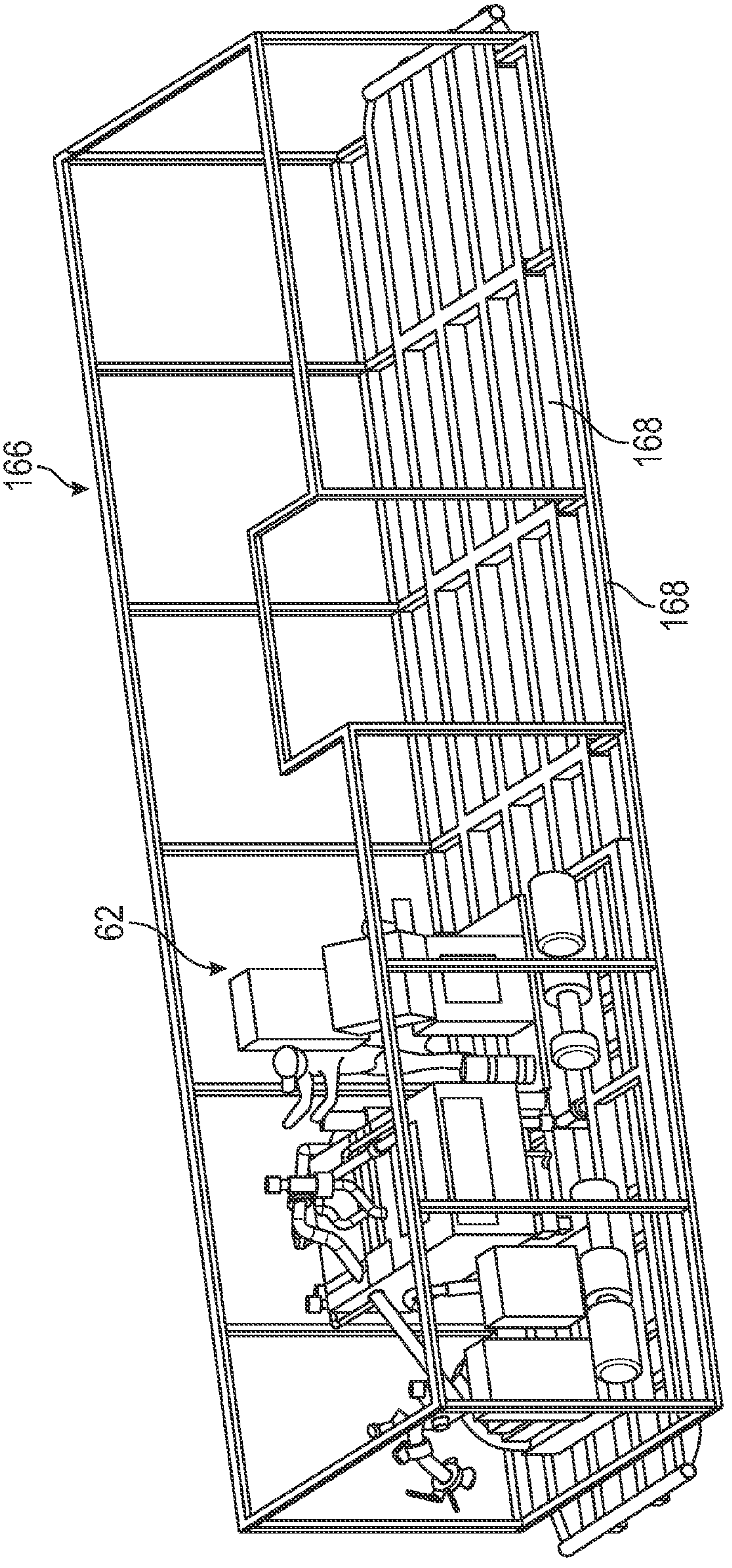
FIG. 5 is an illustration of an example of a cement mixing system incorporated into a hopper house of the rig, according to an embodiment of the disclosure.

In this example, the cement mixing system 62 is located in a hopper house 166 of the rig 32, as further illustrated in FIG. 5. The hopper house 166 may comprise a framework 168 configured to facilitate mounting of many of the components of cement mixing system 62 discussed above. Additionally, framework 168 facilitates assembly onto the rig 32 so as to provide a spatially efficient wellsite layout 30 with fewer components.

With the rig 32 controlling the high-pressure pumping aspects of the cementing operation, appropriate communication protocols are established so as to, for example, set the pump rates. The rig control systems for controlling operation of mud pumps 42 may be utilized, with appropriate modification if needed, to control the cementing fluid pumping operation. Various sensor systems 141 may be employed to monitor both the mud pumping operation and the cementing operation. For example, a flowmeter capable of reading oil based muds may be installed to monitor total displaced fluid. This data may be compared to the stroke counters of the mud pumps and to the rig mud pit levels to verify volume of displaced fluid. Many types of data may be collected and recorded for each drilling job, and different types of data from the cementing operation and mud pumping operation may be combined for use by rig operators.

Depending on the parameters of a given mud pumping and/or cementing operation, various procedures may be implemented to prevent cross-contamination of mud, cement, and/or displacement fluid used in the cementing operation. For example, displacement fluid used during the cementing operation may be pumped to the cement mixing system 62, e.g. to the skid 60, from a rig pressurizing pump, through a downhole flowmeter, and then to the mud pump suction side of the mud pump assembly 40. This routing minimizes the risk of cross contaminating the cement mixing process lines with displacement fluid. Various other routing, flushing techniques, utilization of separate inlet and outlet ports, as well as other procedures may be implemented to reduce the potential for cross-contamination.

It should be noted the overall wellsite layout 30 may have many different configurations. However, use of the rig mud pumps 42 for both mud operations and for the placement of cementing fluid during primary and/or remedial cementing operations substantially reduces the footprint of wellsite layout 30 while eliminating multiple pieces of equipment. Furthermore, the methodology described herein may be adjusted to utilize various numbers of mud pumps 42, various types of rigs 32, and various types of power supplies. Additionally, the rig 32 may be equipped with many types of drilling equipment for drilling different types of boreholes 38. Also, various sequences of drilling, mud pumping, casing, and cementing may be used in constructing the desired well. Similarly, many types of sensors and sensor systems may be employed to monitor the overall construction operation, including mud pumping operations and cementing operations.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for reducing equipment employed in a drilling operation at a wellsite, comprising:

providing a mud pump assembly with mud pumps positioned on a rig located at the wellsite;

delivering electric power to the rig to enable operation of the rig;

using the electric power provided to the rig to operate a cement mixing system to mix a drilling mud;

using a transformer to adjust a voltage of the electric power supplied to the cement mixing system;

using the electric power provided to the rig to operate the mud pumps during a mud pumping operation in which the drilling mud is pumped downhole to facilitate drilling of a borehole;

further using the electric power to operate the cement mixing system to mix a cementing fluid; and subsequently utilizing the mud pumps to pump the cementing fluid during a cementing operation.

2. The method as recited in claim 1, further comprising positioning the cement mixing system on a cement mixer skid to facilitate mixing of the drilling mud and the cementing fluid.

3. The method as recited in claim 2, further comprising connecting the cement mixer skid to the rig.

4. The method as recited in claim 1, further comprising locating the cement mixing system on the rig.

5. The method as recited in claim 1, further comprising flushing the cementing fluid from the mud pump assembly by flowing a flushing fluid through a flush out line of a suction manifold of the mud pump assembly to a cleanout port of the mud pump assembly.

6. The method as recited in claim 1, further comprising providing the cement mixing system with a liquid additive system containing liquid which can be mixed into the cementing fluid to control characteristics of the cementing fluid.

7. A system for use in a well, comprising:

a rig located at a wellsite, the rig having a rig power supply;

one or more drilling components positioned on the rig;

a mud pump assembly having a plurality of mud pumps, the mud pump assembly being positioned on the rig;

a cement mixing system coupled to the rig, the cement mixing system being operable to mix a cementing fluid which is used during a cementing operation with respect to the well, wherein the one or more drilling components, the mud pump assembly and the cement mixing system are powered via the rig power supply; and a generator interface box to enable connection and disconnection of the cement mixing system to the rig power supply without disruption of the rig power supply for the one or more drilling components and the mud pump assembly.

8. The system as recited in claim 7, wherein the cement mixing system is located directly on the rig.

9. The system as recited in claim 7, further comprising a mud supply to provide mud during a mud pumping operation, the cement mixing system and the mud supply both being in fluid communication with the plurality of mud pumps such that the plurality of mud pumps are used to perform the mud pumping operation and the cementing operation.

10. The system as recited in claim 9, wherein the mud pump assembly comprises a flush out line of a suction manifold of the mud pump assembly, and the flush out line comprises a cleanout port to facilitate removal of mud and the cementing fluid with a flushing fluid.

11. The system as recited in claim 10, wherein the mud pump assembly comprises a mud discharge port to discharge the mud toward the well and a cement discharge port to discharge the cementing fluid toward the well.

12. The system as recited in claim 9, further comprising a plurality of sensors for monitoring the cementing fluid during the cementing operation.

13. The system of claim 7, wherein the cement mixing system is operable to mix a drilling mud.

14. The system of claim 7, comprising a cement mixing skid that supports components of the cementing mixing system and couples to the rig, wherein the mud pump assembly is positioned on the rig separate from the cement mixing skid.

15. The system of claim 7, wherein the mud pump assembly is operable to pump the cementing fluid during the cementing operation, and the rig is without separate additional pumps for cementing operations to pump the cementing fluid during the cementing operations.

* * * * *